United States Patent [19]
Lehman

[11] Patent Number: 4,856,100
[45] Date of Patent: Aug. 8, 1989

[54] REPLY RATE LIMITING
[75] Inventor: Robert G. Lehman, Peoria, Ariz.
[73] Assignee: Honeywell Inc., Minneapolis, Minn.
[21] Appl. No.: 213,646
[22] Filed: Jun. 30, 1988
[51] Int. Cl.[4] ............................................. G01S 13/80
[52] U.S. Cl. ...................................... 342/51; 342/30;
342/36; 342/46
[58] Field of Search ........................ 342/51, 31, 30, 32,
342/36, 37, 40, 42, 43, 46, 47, 45

[56] References Cited
U.S. PATENT DOCUMENTS

| Re. 30,069 | 8/1977 | Miller ..................................... | 342/48 |
|---|---|---|---|
| 3,875,570 | 4/1975 | Litchford .............................. | 342/32 |
| 4,028,698 | 6/1977 | Miller et al. .......................... | 342/48 |
| 4,035,801 | 7/1977 | Miller .................................... | 342/48 |
| 4,454,510 | 6/1984 | Crow .................................... | 342/32 |

Primary Examiner—Thomas H. Tarcza
Assistant Examiner—John B. Sotomayor
Attorney, Agent, or Firm—Roger W. Jensen

[57] ABSTRACT

Transponder reply rate limiting employing a circular memory queue to store the times of prior responses up to the limits of circular memory queue capacity. Separate circular memory queues contain the times of (1) long replies, and both (2) long or short replies. Each circular memory queue has a pointer and several offset indicators which are spaced from the pointer to the time entry positions at predetermined intervals according to corresponding preestablished criteria. After each transponder reply, the time of the reply is entered in the circular memory queue at a next pointer location. Eartimes, i.e., earliest allowable response times, are repeatedly determined and compared to time elapsed from a selected reference time. When the current time exceeds the eartime, for a given inquiry signal, a response signal is generated by the transponder electronics and is transmitted to the inquiring ground station. Eartimes are based upon predetermined criteria of allowable response rates in selected time periods. The offset indicators spaced from the queue pointer are employed to extract times from particular locations in the circular memory queue. Each extracted time is adjusted to a predetermined extent to establish a candidate eartime from which a final eartime is selected.

11 Claims, 3 Drawing Sheets

REPLY RATE LIMITING

BACKGROUND OF THE INVENTION

1. Field of the Invention.

The present invention is directed toward the field of reply rate limiting, and particularly toward the field of limiting the number of replies by a transponder to signal inquiries from an external source.

2. Background, Objects and Description of the Prior Art.

Communication between air traffic control ground stations and aircraft transponders has been in practice for many years. Communication typically takes place along FAA specified radio frequency channels in the thousand Megahertz range, e.g., 1030 and 1090 MHz. The transponders employed are radio systems including one or more receivers and transmitters which respond automatically to receipt of predetermined signal inquiries which request a response of predetermined character, according to one of a number of preestablished signal formats requesting specified information, subject to rate limitations.

The air traffic control ground stations repeatedly transmit such signal inquiries with a rotating ground station antenna. However, the aircraft transponder is limited in the number of replies it can make over time due to increased radio interference, power supply restraints, and transponder heat production. In view of these restraints, there is an upper limit as to the number of allowable responses per time interval a transponder can make. In particular, whereas high response rates may be permitted over short time intervals, average response rates over longer time intervals must be lower.

Current aircraft transponders generally perform reply rate limiting by reducing the sensitivity of the transponder receiver, according to known hardware circuit techniques.

SUMMARY OF THE INVENTION

However, according to the invention herein, reply rate limiting is accomplished by storing the times of prior responses in a reply log comprising one or more memory queues having a predetermined storage capacity for entering times of the replies made in response to inquiry. Various kinds of short and long replies are possible, in terms of bit length and content.

The memory queues may for example be circular. Transponder reply rate limiting herein employs one or more circular memory queues to store the times of prior responses up to the limits of the respective circular memory queue capacities, depending upon the selected kinds of responses allowed. Separate circular memory queues contain the times of (1) long replies, and both (2) long or short replies. Each circular memory queue has a pointer and several offset indicators which are spaced from the pointer to the addresses at predetermined intervals according to corresponding preestablished criteria. After each transponder reply, the time of the reply is entered in the appropriate circular memory queue(s) at a next pointer location. Earliest allowable response (EAR) times, i.e., "eartimes", are repeatedly determined and compared to current time "CT" as established by a hardware clock. When CT exceeds the eartime, a response signal is generated in answer to the inquiry received by the transponder electronics and is transmitted to the inquiry ground station. Eartimes are based upon predetermined criteria of allowable response rates in selected time periods. Each offset indicator spaced from the queue pointers of the one or more queues is employed to extract times from particular locations in the circular memory queue. Each extracted time is adjusted to a predetermined extent to establish one or more candidate eartimes from which a final eartime is selected.

The entry and deletion of times in each queue is accomplished at the memory locations indicated by respective associated pointers. Times are read from the memory queue as the location(s) of the offset indicators. The pointer is repeatedly incremented (or decremented) during operation to enable successive access to each memory location of the queue. Each time a reply is made, the time of the reply is entered in the appropriate queue(s) at a next pointer location. According to the invention, eartimes are repeatedly determined and compared to time elapsed from a selected reference time "CT" established by a hardware clock. When the current time exceeds the eartime, for a given inquiry signal, a response signal is generated by the transponder electronics and is transmitted to the inquiring ground station. Eartimes are derived from selected times stored in the circular memory queue, based upon predetermined criteria of allowable response rates in selected time periods. As suggested above, offset indicators spaced from their associated queue pointers in accordance with the indicated criteria are employed to extract times from particular locations in the circular memory queue. Each extracted time is adjusted to a predetermined extent to establish candidate eartimes based upon each criteria. Next, each of the candidate eartimes is examined, and the latest eartime candidate is selected as the eartime to be used to determine when a next response can be made.

BRIEF DESCRIPTION OF THE DRAWING

The objects and advantages of the invention indicated above will become particularly apparent from a detailed consideration of the drawings, in which.

DETAILED DESCRIPTION OF THE PREFERRED EMBODIMENT

Figure 1:
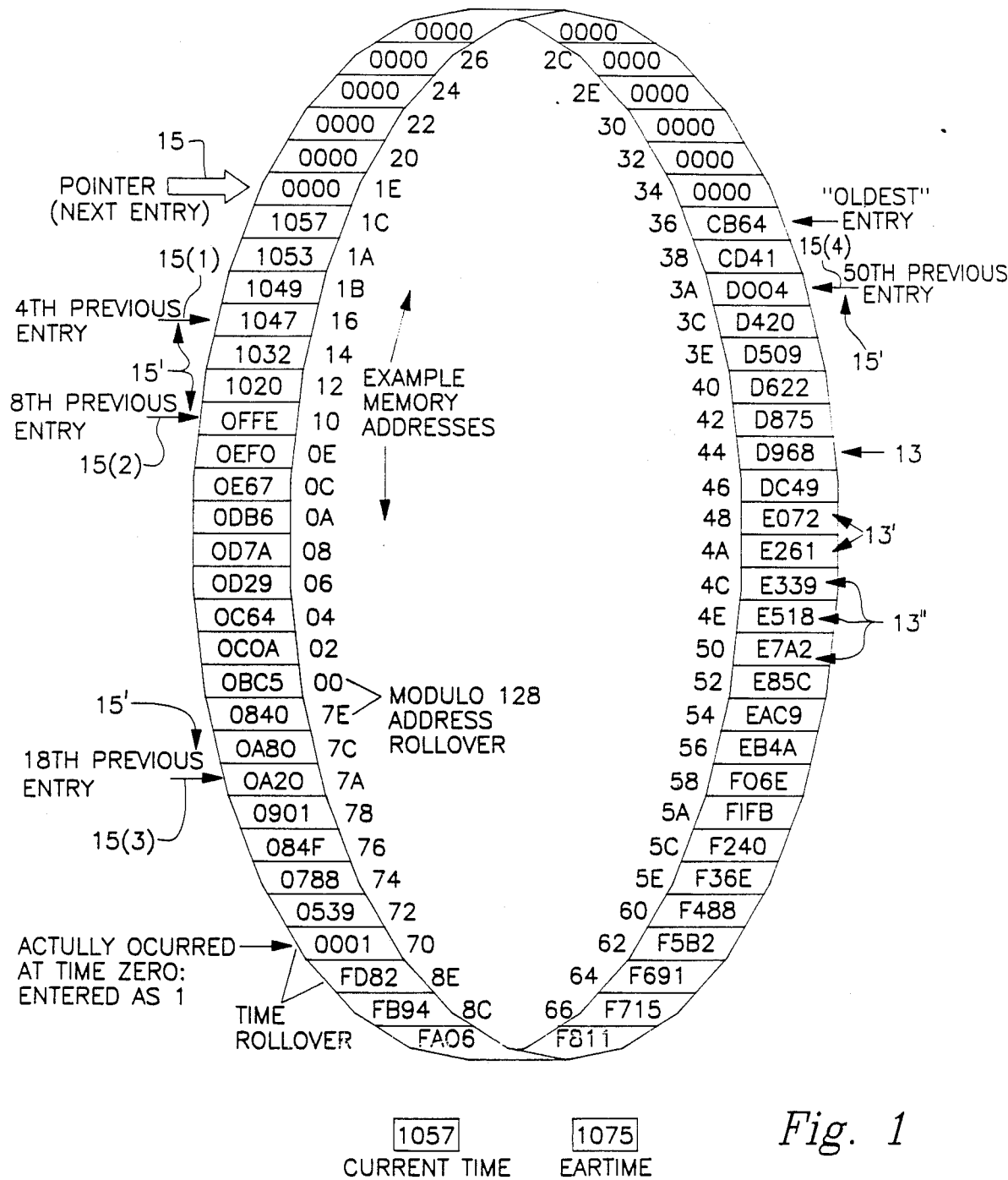
FIG. 1 shows the structure of a circular memory queue containing reply times of prior responses to interrogation, which is employed with the invention herein along with sample addresses, sample data entries, and computed eartime.

FIG. 1 shows the structure of a circular memory queue containing example reply times of prior responses to interrogatons, which is employed with the invention herein. According to one version of the invention which is directed toward the performance of short replies only, is single queue 13 is employed to contain the time entries 13' of the short replies at a multiplicity of successive time entry address locations or positions 13". Time entries 13' are entered at locations 13" toward which a pointer 15 is directed. Offset from the immediate location 13" toward which pointer 15 is directed are a predetermined number of offset indicators 15', alternatively specifically designated 15(1)–15(4), which are for example directed toward respective time entry values T(1), T(2), T(3), and T(4). Offset indicators 15' are spaced from queue pointer 15 in accordance with the criteria indicated above, to permit extraction of time 13' from corresponding locations 13" in circular memory queue 13. Each extracted time 13' is adjusted to a predetermined extent to establish candidate eartimes based upon each criterion. Candidate eartimes are established taking the time entry identified by the offset indicator corresponding to a particular selected time category and modifying the time entry by adding the category time interval, minus one (1) least significant bit (LSB) to compensate for quantization error and to ensure that specified minimum reply rates are achieved.

Each of the candidate eartimes is examined, and the latest eartime candidate is selected as the eartime used to determine when a next response can be made. According to the version of the invention in which both long or short replies are to be made, a long memory queue is employed, and the times of long replies are entered into both queues, as the times of the short replies are entered only into the long or short queue. Candidate eartimes from the long or short queue are examined to determine an eartime for the next long or short reply. Similarly, candidate eartimes from the long queue are examined to determine the eartime of the next long reply. Long or short queues need only be fity (50) entries in length. Long queues need only be sixteen (16) entries in length. Queues of other lengths, preferably queues of lengths equal to integral powers of two (2) in order to permit ease of addressing, can be implemented as well. Eartime value zero (0) is reserved to indicate that there is no eartime entry intended at that memory location. This occurs when an eartime value has been purged, thereby indicating that replies can be made at will, without any reply rate limiting in effect. Actual computed eartimes of zero (0) are indicated as minus one (−1) LSB to preserve the integrity of the reserved value zero (0). Queue time entries of zero (0) are particularly reserved to indicate that no entry is intended or that a prior actual time entry has been purged. Actual time entries of zero (0) are entered as a positive one (+1) LSB to preserve the integrity of the reserved zero (0) value entry.

The time entries used are subject to a resolution requirement to account for digital quantization error. Simply stated, sufficient resolution is required to ensure acceptable accuracy for calculations involving the the shortest reply rate limiting time interval employed, e.g., 1.6 ms, according to the embodiment herein. The range of the time values permitted is a function of the interval between examining the time values for the purpose of purging them before they become so old that differences between them and the current time would otherwise become indeterminate considering the necessarily limited, finite range possible in any practical implementation. Computed eartimes are purged when they fall behind the current time. Purging is performed on stale queue time entries which are defined as time entries which are older than the length of the longest reply rate limiting time interval used, e.g., one (1) second, herein. The resulting maximum accumulable difference between the current time and eartimes or queue times must be less than or equal to half the range of the time values used. The most significant bit (MSB) of difference calculations can then be used to determine whether time values are ahead of or behind one another, regardless of modulo N overflow or rollover of the state of the processor sign bit, which will yield incorrect results. If the MSB resulting from subtracting the eartime from the current time is zero (0), a response will be permitted.

The criteria employed to determine the number of offset indicators 15' to be employed with each of queues 13, and the extent each of the offset indicators 15' are in fact offset from its corresponding pointer 15 are described below. According to the embodiment herein, first offset indicator 15(1) for the long or short reply queue is positioned at an address location four (4) time entry positons behind pointer 15. The second, third and fourth offset indicators 15(2), 15(3), and 15(4), respectively, for the long or short reply queue, are positioned at respective address locations eight (8), eighteen (18), and fifty (50) time entry positions behind the position of pointer 15. These respective offsets correspond to Mode S reply rate limits which permit no more than four (4) long or short replies during any time period of 1.6 milliseconds, no more than eight (8) long or short replies during any time period of 25 milliseconds, no more than eighteen (18) long or short replies during any time period of 100 milliseconds, and no more than fifty (50) long or short replies within any one second. Similarly, the firt offset indicator 15(1) for the long reply queue is positioned at an address location two (2) time entry positions behind pointer 15. The second, third and fourth offset indicators 15(2), 15(3), and 15(4), respectively, are positioned at respective address locations four (4), six (6), and sixteen (16) time entry positions behind the position of pointer 15. These respective offsets correspond to Mode S reply rate limits which permit no more than two (2) long replies during any time period of 1.6 milliseconds, no more than (4) long replies during any time period of 25 milliseconds, no more than six (6) long replies during any time period of 100 milliseconds, and no more than sixteen (16) long replies within any one second.

Figure 2A:
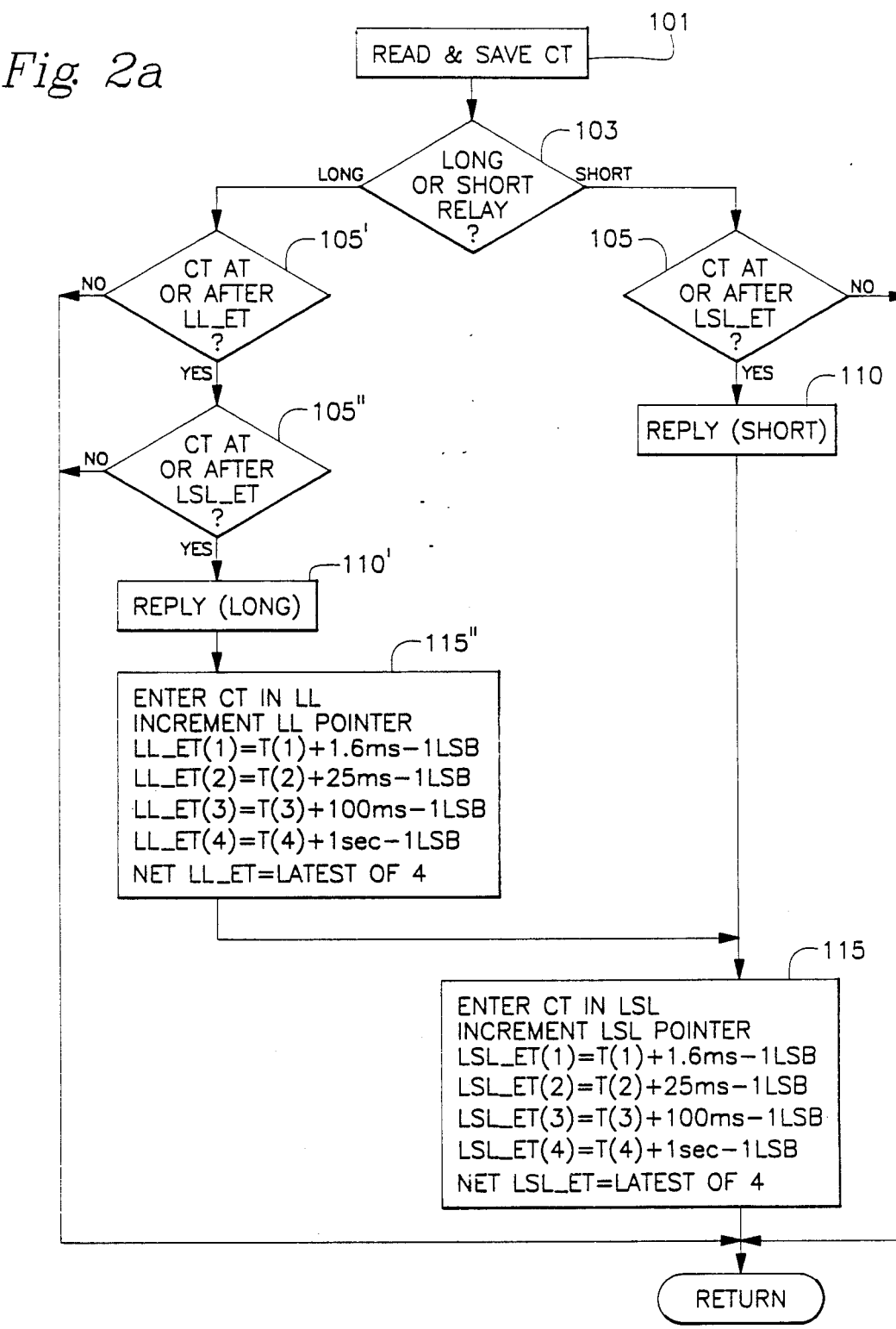
FIG. 2A shows a block diagram of the implementation of a mode S reply rate limiting technique according to the invention herein.

FIG. 2A shows a block diagram of the implementation of a mode S reply rate limiting technique according to the invention herein. This is shown in psuedocode at Appendix I. In particular, according to FIG. 2A, the current time ("CT") is read and saved, as indicated at block 101. Next a determination is made, whether the reply to be made is long or short, as indicated by decision block 103. For short replies, a next determination is made at block 105 regard to whether CT is at or after the long or short reply log eartime. If it is not, no reply is made to a particular interrogation. If the eartime is equalled or exceeded by CT, a short reply of a character requested by the interrogation signal is made, as indicated at block 110. Then, as indicated at block 115, CT is entered in the long or short reply log, the long or short reply log pointer is incremented, and a new long or short reply log eartime is determined. The new long or short reply log eartime is determined according to this version of the invention, by reading the circular memory queue of FIG. 1 at the locations of each of the offset indicators, extracting the times contained at the addresses indicated by the offset indicators, and adjusting the extracted times by predetermined amounts corresponding to the respective offset indicators. As suggested in block 115 (as well as in block 115'), the adjustment includes reducing the eartime by one LSB. The next long or short reply eartime is the latest one of the candidate eartimes. Similarly, if a long reply is to be made, a determination is made at block 105' with regard to whether CT is at or after the long reply log eartime. If it is not, no reply is made to a particular interrogation. If the eartime is equalled or exceeded, and a next determination at block 105" is affirmative with regard to whether CT is at or after the current long or short reply log eartime, a long reply is made, as indicated at block 110'. Then, as indicated at block 115', CT is entered in the long reply log, the long reply log pointer is incremented, and a new long reply log eartime is determined. The new long reply log eartime is determined according to this version of the invention, by reading a long circular memory queue along the pattern of FIG. 1 at the locations of each of the offset indicators, extracting the times contained at the addresses indicated by the offset indicators, and adjusting the extracted times by predetermined amounts corresponding to the respective offset indicators. The next long reply eartime is the latest one of the candidate eartimes. Then, as indicated at block 115, CT is entered in the long or short reply log, the long or short reply log pointer is incremented, and a new long or short reply log eartime is determined. The new long or short reply log eartime is determined according to this version of the invention, by reading the circular memory queue of FIG. 1 at the locations of each of the offset indicators, extracting the times contained at the addresses indicated by the offset indicators, and adjusting the extracted times by predetermined amounts corresponding to the respective offset indicators. The next long or short reply eartime is the latest one of the candidate eartimes. A return is made through block 120 to await a next interrogation. The pseudocode of Appendix I further develops the flow chart of FIG. 2A.

Figure 2B:
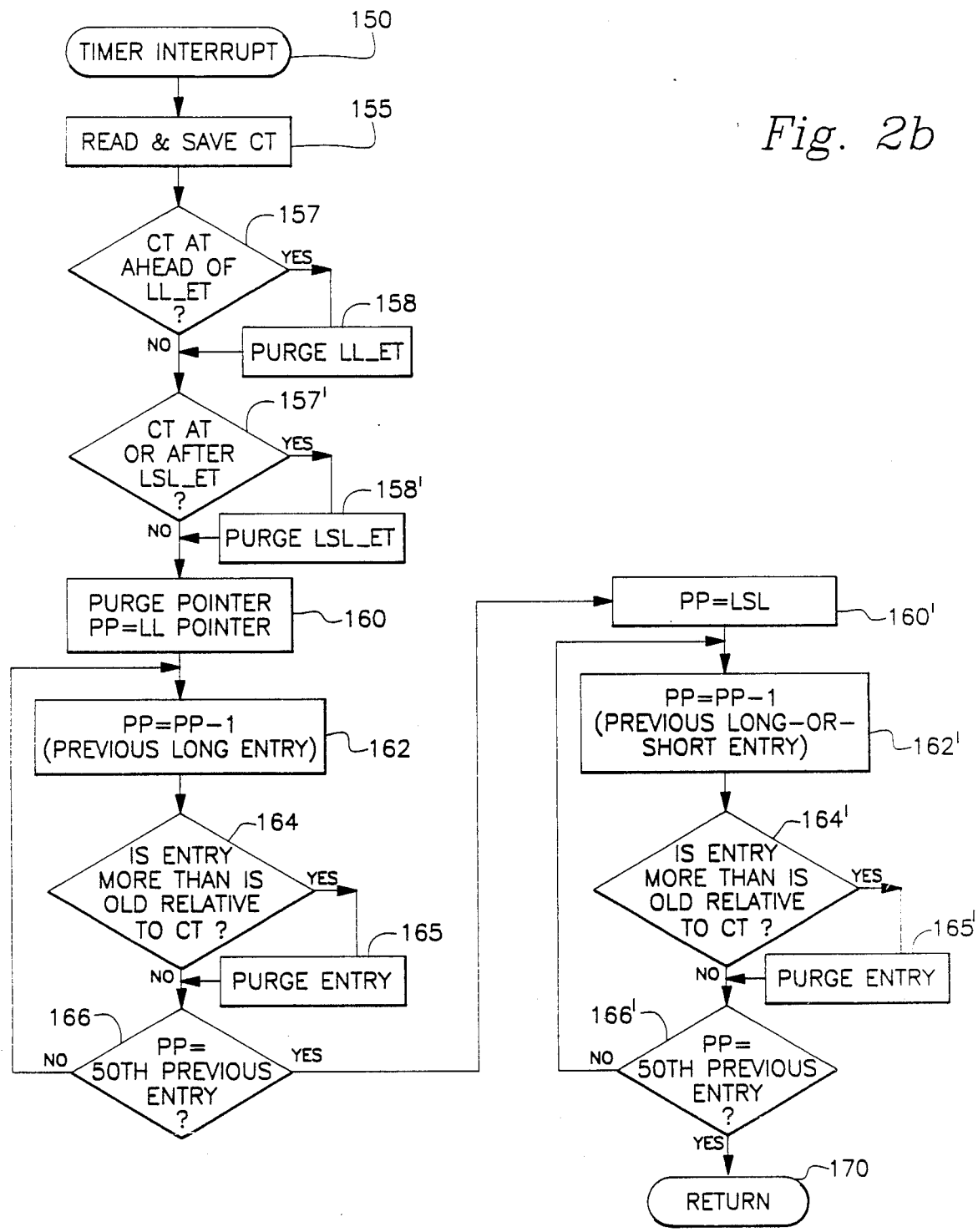
FIG. 2B shows a block diagram of a technique for conducting purging of stale eartimes from memory, and the purging of stale information regarding the times at which replies to interrogations were performed, from the memory queues containing the information.

FIG. 2B shows a block diagram of a technique for conducting purging of stale eartime, and stale times in the respective queues indicated above. The pseudocode of Appendix II provides additional details beyond those shown in FIG. 2B. In particular, FIG. 2B shows that purging is initiated by a timer interrupt, as indicated at block 150. Current clock time "CT" is next read and saved, as indicated at block 155. Then, for purging eartimes, a determination is made as to whether CT is ahead of the long reply log eartime, as indicated at block 57. If so, then the long reply log eartime is purged, as indicated at block 158. Next, a determination is made as to whether CT is ahead of the long or short reply log eartime, as indicated at block 157'. If so, then the long or short reply log eartime is purged, as indicated at block 158'. Then, to purge the queues of stale times, as indicated at block 160, a purge pointer is determined by setting it equal to the current long reply log pointer address value. The long reply log pointer is then decremented by one time entry position, as indicated at block 162, and a determination is made as to whether the time entry at the decremented time entry position is greater than, i.e., more than, one second ("1s") old relative to CT. If so, then the time entry at that particular time entry position or location is purged, as indicated at block 165. Next, a determination is made regarding whether all time entry positions considered for purging have in fact been considered, as indicated at block 166. If not, then the purge pointer is again decremented, as indicated at block 162, and the process repeats itself again. If so, the purge pointer is reset equal to the long or short reply log pointer, as indicated at block 160'. The long or short reply log pointer is then decremented by one time entry position, as indicated at block 162', and a determination is made as to whether the time entry at the decremented time entry position is greater than, i.e., more than, one second ("1s") old relative to CT. If so, then the time entry at that particular time entry position or location is purged, as indicated at block 165'. Next, a determination is made regarding whether all time entry positions considered for purging have in fact been considered, as indicated at block 166'. If not, then the purge pointer is again decremented, as indicated at block 162', and the process repeats itself again. When all time entry positions considered for purging have been considered, the process completes at return block 170.

The technique indicated above is implemented with an Intel 8097-90 16-bit microcontroller in conjunction with associated hardware elements including memory devices, including RAM chips for example, as is well known to one skilled in the art. The technique is implemented with an XS-850 Mode S transponder for handling short repsonses involving only a single memory queue according to the invention. The XS-850 Mode S transponder is part of the Primus II RCZ-850 Integrated Comm Unit available commercially from Honeywell Inc., Phoenix, Az.

Many changes and alterations will occur to those skilled in the art, and I do not wish to be limited to the disclosures used in connection with the preferred embodiment. I intend only to be limited by the following claims.

I claim:

1. An arrangement for determining whether to respond with replies to signal inquiries from an external source which repetitively transmits inquiry signals, said arrangement comprising means for storing a predetermined number of reply times at which replies were made to inquiry signals; means for entering the times of said replies in said means for storing; means for determining eartimes from said predetermined number of reply times; means for determining current time; and means for enabling a response when the current time exceeds said eartime.

2. The arrangement of claim 1 further comprising means for selecting times from said means for storing.

3. The arrangement of claim 1 further comprisng means for pointing toward a selected time entry position in said means for storing.

4. The arrangement of claim 1 further comprising means for offset indicating selected time entry positions in said means for storing.

5. The arrangement of claim 1 wherein said means for determining eartimes includes means for extracting selected times from said means for storing, and said means for determining is effective for adjusting each extracted time to a predetermined extent to establish candidate eartimes.

6. The arrangement of claim 5 further comprising means for examining each of said candidate eartimes.

7. The arrangement of claim 6 further comprising means for selecting the latest of said candidate eartimes in order to enable a next response.

8. The arrangement of claim 2 wherein said means for selecting times from said means for storing select times based upon predetermined criteria of allowable response rates in selected time periods.

9. The arrangement of claim 3 further comprising at least a single offset indicator spaced from said means for pointing.

10. The arrangement of claim 1 further comprising means for purging a time entry when it becomes stale.

11. The arrangement of claim 1 further comprising means for purging an eartime when it becomes stale.

* * * * *